May 24, 1960
T. N. HANNANT ET AL
2,937,846
DOUBLE VENT OPERATED FLOOD VALVE
Filed June 10, 1957
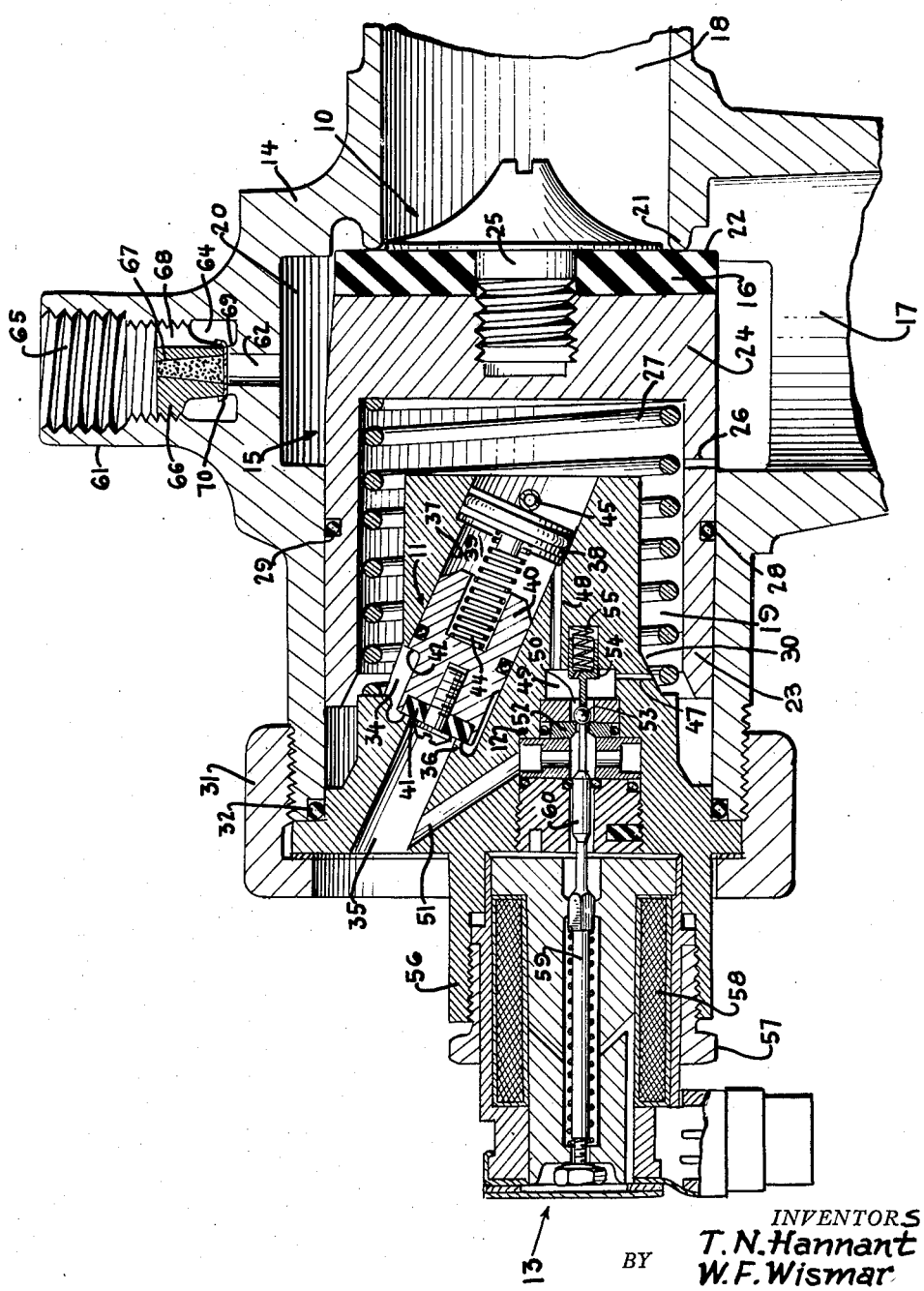
INVENTORS
T. N. Hannant
W. F. Wismar
BY
ATTORNEY
J. William Carson

United States Patent Office 2,937,846
Patented May 24, 1960

2,937,846

DOUBLE VENT OPERATED FLOOD VALVE

Theodore N. Hannant, Cedar Grove Township, Essex County, and William F. Wismar, Union, N.J., assignors to Specialties Development Corporation, Belleville, N.J., a corporation of New Jersey Filed June 10, 1957, Ser. No. 664,532

1 Claim. (Cl. 251—29)

The present invention relates to valves, and, more particularly, to flood valves of the vent operated type.

A type of fire extinguishing system widely used to combat fires in inaccessible or unattended areas is the "total flood" system, in which the extinguishing agent is stored under high pressure and is released rapidly to flood the area by a remotely or automatically controlled valve. In this type of system, it is essential that all of the stored extinguishing agent be released practically instantaneously, wherefore, the valve must operate very rapidly if this system is to be effective. It is also desirable that the valve be operatable by a small force.

One type of valve previously used in these systems is the burst disc type, in which an electrically detonated powder cartridge is used to burst a disc which seals the container in which the extinguishing agent is stored. This type of valve, while it gives the desired rapid action, is not completely reliable because the cartridge might be defective and fail to fire. Since the cartridge can be tested only by detonating it, there is no way of knowing if the valve will operate until an attempt is made to utilize the system.

The burst disc type valve has the further disadvantages of requiring the replacement of the discs and the cartridges after each use of the system and the rebuilding of the valve in order to replace the disc.

The single vent operated type of valve has also been used in these systems, in these valves a biasing pressure holds a main valve closed and a passageway, provided to vent off this pressure and cause the valve to operate, is controlled by a vent valve positioned in the passageway. Since the vent valve is held closed by a force directly proportional to the cross sectional area of the venting passageway, a valve provided with a large diameter venting passageway for quick operation requires a large force to operate the vent valve. This type of valve, therefore, is unacceptable in a system where a valve must operate both rapidly and in response to a small external force.

Accordingly, an object of the present invention is to provide a flood valve which is rapid and reliable in operation.

Another object is to provide a flood valve which requires a minimum force to operate the same and uses no expendable parts.

A further object is to accomplish the foregoing in a simple, practical and economical manner.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

The single figure of the drawing is a longitudinal sectional view of the valve in accordance with the present invention.

Referring to the drawing in detail, the valve of the present invention comprises a main valve 10 of the type which is normally biased in its closed position by fluid under pressure, a venting valve 11 which controls the venting of this biasing pressure and is itself normally biased in its closed position by fluid under pressure, a second venting valve 12 controlling the venting of the biasing pressure acting on the venting valve 11, and valve operating means 13 for actuating the valve 12 to thereby cause the venting valve 11 and the main valve 10 to then operate in turn.

The main valve 10 generally includes a casing 14, a piston 15 within the casing, and a valve member 16 attached to the piston. The casing 14 is provided with an inlet opening 17 adapted to be attached to a container filled with fluid under pressure, an outlet opening 18 disposed at right angles to the inlet opening and adapted to be attached to a distribution pipe, a piston chamber 19 having an enlarged portion 20 adjacent the inlet and outlet openings, and an annular valve seat 21 formed about the inwardly facing end of the outlet opening 18. The piston 15 is slidably positioned within the chamber 19 and includes a tubular portion 23 in sliding contact with the wall of chamber 19, and a head portion 24 adjacent the valve seat 21.

The valve member 16 is attached to the face of the head portion 24 by a screw 25 and is adapted to abut the valve seat 21. The valve seat 21 is of smaller diameter than the valve member 16 to provide a peripheral piston surface 22 on the valve member 16 when the valve 10 is in its closed position, that is, when the valve member 16 is in contact with the valve seat 21. A pressure biasing passageway 26 is provided in the piston tubular portion 23 which is positioned so that it is in communication with the chamber portion 20 only when the main valve 10 is in its closed position and a spring 27 urges the piston 15 into the valve closing position. An O-ring 28 is positioned within an annular slot 29 formed in the tubular piston portion 23 to provide a seal between the tubular portion and the wall of the chamber 19.

The vent valve 11 is incorporated within a vent body 30 which is secured within the chamber 20 by a retaining ring 31 threadably engaging the casing 14 and a fluid tight seal between the vent body 30 and the casing 14 is provided by a packing ring 32. A venting passageway is provided within the body 30 and includes a generally cylindrical inlet section 34, in communication with the chamber 20, and an outlet section 35, of smaller diameter in communication with the atmosphere. A valve seat 36 is formed in the inlet section 34 about the inwardly facing end of the outlet section 35. A cylindrical bore 37, co-axial with and of larger diameter than the outlet section 35, is provided in the vent body 30 adjacent the inlet section 34 and together with a cylindrical plug 38 positioned therein defines a piston chamber 39. A substantially cylindrically shaped piston 40 slidably mounted in chamber 39 carries a valve member 41, at one end, adapted to engage the valve seat 36 and is provided with an annular piston surface 42 in fluid flow communication with the inlet section 34. A spring 44 positioned between the piston 40 and the plug 38 urges the piston into its valve closed position and urges the plug against a pin 45 positioned across the bore 37. A biasing passageway for the vent valve 11 is provided in the body 30 and includes a small diameter bore 47 in communication with the chamber 19, a larger diameter bore 48 in communication with the portion of chamber 39 behind the piston 40, and a chamber 49 connecting these two bores.

The second vent valve 12 is incorporated within the vent body 30, adjacent the chamber 49, and includes an inlet 50 in communication with the chamber 49, an outlet 51 in communication with the atmosphere, a valve seat 52 therebetween, a valve member 53 adapted to abut the valve seat 52, a pusher 54 adapted to contact the valve member 53, and a spring 55 adapted to urge the pusher against the valve member 53 to hold the valve member against its seat 52.

The valve operating means 13, which may be of the electrically operated solenoid type, is positioned within a tubular extension 56 of the vent body 30 and is secured in place by a retaining bushing 57. The solenoid comprises a coil 58, an armature 59 adapted to be moved when the coil is energized, and a stem 60 carried by the armature and positioned to unseat the valve member 53 when the armature moves in response to the energization of the coil. It is to be understood that the valve operating means is described above as a solenoid only for the purpose of illustration and that any other locally or remotely or manually or automatically operated control head could be used instead.

A recharging nipple 61 is provided in the casing 14 and has concentric bores therein providing an orifice 62 in communication with the chamber portion 20, an internally threaded safety plug chamber 64 adjacent to the orifice, and an inlet opening 65 internally threaded for attachment to a high pressure charging line. An externally threaded safety plug 66, provided with a fusible portion 67 and a plurality of by-pass grooves 68, is adjustably positioned within the chamber 64. A valve seat 69 is formed about the external end of the orifice 62 and a sealing washer 70, adapted to abut the valve seat 69, is removably attached to the end of the safety plug 66.

In operation, the valve is connected to a container through the main valve inlet 17 and the container is charged with high pressure fluid medium through the orifice 62 in a manner to be described hereinafter. During the charging operation, the main valve 10, the venting valve 11, and the second venting valve 12, are held closed by their respective biasing springs 27, 44, and 55. High pressure fluid enters the chamber 19 through the passageway 26, then enters the chamber 49 through the bore 47, and finally enters the chamber 39 through the bore 48. The pressure in the chamber 19, acting against the large surface of piston head portion 24, holds the valve member 16 against the valve seat 21 in opposition to the action of the high pressure fluid in inlet 17 against the peripheral piston surface 22. Likewise, the pressure in chamber 39, acting against the large rear surface of piston 40, holds the valve member 41 against the valve seat 36 in opposition to the pressure in inlet 34 acting against the piston surface 42.

In order to discharge the container, the coil 58 is energized to move the armature 59 and cause the stem 60 to unseat the valve member 53. The chamber 49 is then placed in communication with the atmosphere through the outlet 51, and the high pressure fluid medium in the chamber 39 is quickly vented through the bore 48. The small diameter of the bore 47 prevents a substantial reduction of the pressure in chamber 20 from taking place during the venting of chamber 39. Therefore, the pressure in inlet 34 remains high and acts on the piston surface 42 with sufficient force to drive the piston 40 rapidly toward the plug 38 opening the valve 11, and allowing the pressure in chamber 19 to be vented through the outlet section 35 of the venting passageway. With the pressure in chamber 19 removed, the container pressure acting on the peripherial piston surface 22 drives the piston 15 into the chamber 19, opening the main valve 10 to allow the container to discharge through the outlet 18.

In order to recharge the container, a recharging line nozzle is screwed into the inlet 65. The nozzle incorporates a tool (not shown) adapted to engage and rotate the safety plug 66 to cause it to move axially with respect to the valve seat 69. With the nozzle attached, the plug 66 is screwed away from the seat 69 by the tool, allowing the recharging medium to flow through the grooves 68, the orifice 62, the chamber portion 20, the inlet 17, and into the container. When the desired container pressure has been established, the plug is screwed toward the orifice 62 until the washer 70 seals against the seat 69.

If the ambient temperature should rise to a predetermined value at which the pressure of the medium in the container becomes excessive, the fusible portion 67 of the safety plug 66 melts and the container is discharged through the opening 65.

From the foregoing description, it will be seen that the present invention provides an improved flood valve which will operate rapidly and dependably, requires a minimum of input force to initiate its operation, and does not require the replacement of parts after each operation.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

In a valve assembly for controlling the discharge of high pressure fluid medium, the combination of a casing having an inlet and an outlet provided with a valve seat therebetween and having a piston chamber therein; a piston in said chamber, said piston having a tubular portion and a head portion; a valve member carried by said head portion of said piston and adapted to abut said seat; pressure biasing passageway means in said piston tubular portion placing in communication said inlet and a portion of said chamber in back of said piston head portion for conducting high pressure fluid medium into said chamber to urge said piston toward said valve seat; a formation within said chamber adjacent said piston tubular portion and extending into said tubular portion at least when said piston is moved away from said seat; controlled venting passageway means for said chamber positioned in said formation and including an inlet in communication with said chamber, an outlet to the atmosphere, a valve seat between said last mentioned inlet and outlet, a chamber having a pressure biasing passage in communication with said first mentioned chamber, a piston element in said last mentioned chamber in front of the passage therein and valve element carried by said piston element adapted to abut said last mentioned seat; a normally closed valve in a branch passageway positioned in said formation and having an inlet in communication with said passage and an outlet to the atmosphere; and means for operating said valve to open the same.

References Cited in the file of this patent
UNITED STATES PATENTS

| 1,228,653 | De Spirito | June 5, 1917 |
| 1,307,207 | Mitchell | June 17, 1919 |
| 1,841,456 | Shand | Jan. 19, 1932 |
| 1,907,683 | Tews | May 9, 1933 |
| 2,274,663 | Brisbane | Mar. 3, 1942 |
| 2,664,916 | Conley | Jan. 5, 1954 |
| 2,693,814 | Richards | Nov. 9, 1954 |